United States Patent
Qiu et al.

(10) Patent No.: US 9,612,476 B2
(45) Date of Patent: Apr. 4, 2017

(54) STRUCTURE OF HIGH COLOR GAMUT LIQUID CRYSTAL DISPLAY MODULE

(71) Applicant: Shenzhen China Star Optoelectronics Technology Co., Ltd., Shenzhen, Guangdong (CN)

(72) Inventors: Yongyuan Qiu, Guangdong (CN); Zanjia Su, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 0 days.

(21) Appl. No.: 14/390,027

(22) PCT Filed: Aug. 15, 2014

(86) PCT No.: PCT/CN2014/084457
§ 371 (c)(1),
(2) Date: Oct. 1, 2014

(87) PCT Pub. No.: WO2016/011691
PCT Pub. Date: Jan. 28, 2016

(65) Prior Publication Data
US 2016/0026040 A1 Jan. 28, 2016

(30) Foreign Application Priority Data
Jul. 25, 2014 (CN) .......................... 2014 1 0361409

(51) Int. Cl.
*G02F 1/1335* (2006.01)
*F21V 8/00* (2006.01)
*G02F 1/1362* (2006.01)

(52) U.S. Cl.
CPC ....... *G02F 1/133617* (2013.01); *G02B 6/005* (2013.01); *G02B 6/0073* (2013.01);
(Continued)

(58) Field of Classification Search
CPC ......... G02F 2202/046; G02F 1/133514; G02F 2001/133624; G02F 2001/133614;
(Continued)

(56) References Cited

U.S. PATENT DOCUMENTS

2001/0038426 A1* 11/2001 Bechtel ............. G02F 1/133617
349/71
2007/0229736 A1* 10/2007 Wang .................... G02B 6/005
349/106
(Continued)

FOREIGN PATENT DOCUMENTS

CN 103207476 A * 7/2013

*Primary Examiner* — Nathanael R Briggs
(74) *Attorney, Agent, or Firm* — Andrew C. Cheng

(57) ABSTRACT

The present invention provides a structure of a high color gamut liquid crystal display module, which includes a backlight module (1) and a liquid crystal display panel (3) arranged above the backlight module (1). The backlight module (1) includes an LED light source (17) and the LED light source (17) is an LED light source having a wavelength below 460 nm. The liquid crystal display panel (3) includes a TFT substrate (31), a CF substrate (33) arranged above the TFT substrate (31), a liquid crystal layer (35) arranged between the TFT substrate (31) and the CF substrate (33), and a fluorescent powder layer (5) arranged on a lower surface of the TFT substrate (31). The CF substrate (33) includes red, green, and blue sub-pixel units that are arranged in a matrix. The fluorescent powder layer (5) includes at least two of red, green, and blue fluorescent powder units (51, 53, 55), which are arranged to respectively correspond to the blue, green, or blue sub-pixel units. The structure effectively increases color gamut of a liquid crystal display module and provides the liquid crystal display module with high color saturation.

8 Claims, 5 Drawing Sheets

(52) U.S. Cl.
CPC ...... *G02F 1/1362* (2013.01); *G02F 1/133514* (2013.01); *G02F 2001/136222* (2013.01)

(58) Field of Classification Search
CPC ............. G02F 1/133617; G02F 1/1362; G02F 2001/136222; G02B 6/005; G02B 6/0073
See application file for complete search history.

(56) References Cited

U.S. PATENT DOCUMENTS

| | | | | |
|---|---|---|---|---|
| 2010/0002413 | A1* | 1/2010 | Igarashi | C09K 11/0883 362/84 |
| 2012/0287381 | A1* | 11/2012 | Li | G02F 1/133617 349/106 |
| 2013/0092971 | A1* | 4/2013 | Chen | H01L 33/505 257/99 |
| 2013/0335677 | A1* | 12/2013 | You | G02F 1/133609 349/65 |

* cited by examiner

STRUCTURE OF HIGH COLOR GAMUT LIQUID CRYSTAL DISPLAY MODULE

BACKGROUND OF THE INVENTION

1. Field of the Invention

The present invention relates to the field of liquid crystal displaying, and in particular to a structure of a high color gamut liquid crystal display module.

2. The Related Arts

Liquid crystal displays (LCDs) have a variety of advantages, such as thin device body, low power consumption, and being free of radiation, and are thus of wide applications, such as liquid crystal televisions, mobile phones, personal digital assistants (PDAs), digital cameras, computer monitors, and notebook computer screens.

Most of the liquid crystal displays that are available in the market are backlighting liquid crystal displays, which generally comprise an enclosure, a liquid crystal panel arranged in the enclosure, and a backlight module mounted in the enclosure.

The liquid crystal panel is structurally made up of a color filter (CF) substrate, a thin-film transistor (TFT) array substrate, and a liquid crystal layer arranged between the two substrates, of which the principle of operation is to control the rotation of the liquid crystal molecules of the liquid crystal layer by application of a driving voltage to the two glass substrates in order to refract out the light emitting from the backlight module to generate an image.

The backlight modules can be classified in two types, namely a side-edge backlight module and a direct backlight module, according to the site where light gets incident. The direct backlight module comprises a light source, such as a cold cathode fluorescent lamp (CCFL) or a light-emitting diode (LED), which is arranged at the backside of the liquid crystal panel to directly form a planar light source supplied to the liquid crystal panel. The side-edge backlight module comprises an LED light bar, serving as a backlight source, which is arranged at an edge of a backplane to be located rearward of one side of the liquid crystal panel. The LED light bar emits light that enters a light guide plate (LGP) through a light incident face at one side of the light guide plate and is projected out of a light emergence face of the light guide plate, after being reflected and diffused, to pass through an optic film assembly so as to form a planar light source for the liquid crystal panel.

Recently, due to the rapid development of the organic light emitting display (OLED) technology, the LCDs are facing a variety of challenges. Compared to the OLEDs, the LDCs show weakness in various aspects, including device thinning, surface curving, and color saturation. To achieve high color saturation of the LCDs and provide the liquid crystal display modules with high color gamut, such purposes are achieved in the known techniques by adjusting the CF or adopting high color saturation LED backlight source (such as LEDs that comprise red and green fluorescent powders or LEDs that comprise multiple color chips.

Theoretically, one way to achieve high color saturation is to expand the triangular area defined by the color points of the pure colors of the three primary colors, namely red (R), green (G), and blue (B), as large as possible in a CIE (the International Commission on Illumination) chromaticity diagram in order to obtain an enlarged NTSC (National Television System Committee) area. Referring to FIG. 9, the NTSC color saturation of currently common liquid crystal display modules is 72%. To enlarge the area defined by the R, G, and B color points of a liquid crystal display module, one way is to increase the thickness of the CF in order to reduce the half peak widths of the R, G, and B spectrums and another way is to optimize the wavelengths of the R, G, and B spectrums by adjusting the light source so as to make the R wavelength that corresponds to the peak longer, the G wavelength closer to 520 nm, and the B wavelength shorter and simultaneously reduce the half peak widths of the R, G, and B spectrums. Referring to FIG. 1, the half peak widths of R, G, and B of the CF spectrums of the commonly used liquid crystal display modules are relatively wide and overlapping occurs among the colors. Referring to FIG. 2, when light emitting from a white LED passes through the backlight module to be projected out of the CF, the spectrums of the pure colors of the three primary colors, R, G, and B, obtained with the liquid crystal display module are generally not ideal and are affected by the characteristic of the CF so as to show a tailing phenomenon of the spectrums of the three primary colors, R, G, and B, leading to increased half peak widths, reduced color purities, and inward contraction of the corresponding color points in the CIE diagram, making it opposite to the expectation of high color saturation.

SUMMARY OF THE INVENTION

An object of the present invention is to provide a structure of a high color gamut liquid crystal display module, which reduces color overlapping of the three primary colors of R, G, and B resulting from the half peak widths of the CF spectrums, effectively increases the color gamut of a liquid crystal display module, provides the liquid crystal display module with high color saturation, has a simple structure, and can be easily achieved.

To achieve the above object, the present invention provides a structure of a high color gamut liquid crystal display module, which comprises a backlight module and a liquid crystal display panel arranged above the backlight module. The backlight module comprises a light-emitting diode (LED) light source. The LED light source is an LED light source having a wavelength below 460 nm. The liquid crystal display panel comprises a thin-film transistor (TFT) substrate, a color filter (CF) substrate arranged above the TFT substrate, a liquid crystal layer arranged between the TFT substrate and the CF substrate, and a fluorescent powder layer arranged on a lower surface of the TFT substrate. The CF substrate comprises red, green, and blue sub-pixel units arranged in a matrix. The fluorescent powder layer comprises at least two of red, green, and blue fluorescent powder units arranged to correspond to red, green, or blue sub-pixel units.

The red, green, and blue sub-pixel units respectively comprise red, green, and blue color resist units. The fluorescent powder layer comprises the red, green, and blue fluorescent powder units. The red, green, and blue fluorescent powder units are arranged to respectively correspond to the red, green, and blue color resist units.

The LED light source is a blue LED light source. The red and green sub-pixel units respectively comprise the red and green color resist units. The fluorescent powder layer comprises the red and green fluorescent powder units. The red and green fluorescent powder units are arranged to respectively correspond to the red and green color resist units.

The blue sub-pixel unit comprises a blue color resist unit.

The fluorescent powder layer further comprises a carrier. The red, green, or blue fluorescent powder units are arranged on the carrier. The carrier is attached to a lower surface of the TFT substrate.

The carrier comprises a transparent film or a glass plate. The transparent film is made of a material of polyethylene terephthalate, polypropylene, or polymethyl methacrylate.

The fluorescent powder layer is directly attached to the lower surface of the TFT substrate.

The red, green, or blue fluorescent powder units are formed of nitride fluorescent powders, sulfide fluorescent powders, or quantum dot fluorescent powders.

The structure of the high color gamut liquid crystal display module further comprises a protective layer. The protective layer covers the red, green, or blue fluorescent power units. The protective layer is made of a material of silicon rubber.

The backlight module further comprises a light guide plate, an optical film assembly arranged on an upper surface of the light guide plate, and a bottom reflector plate arranged on a lower surface of the light guide plate. The LED light source is arranged at one side of the light guide plate.

The efficacy of the present invention is that the present invention provides a structure of a high color gamut liquid crystal display module, which comprises an LED light source having a wavelength below 460 nm and a fluorescent powder layer arranged on a lower surface of a TFT substrate with the fluorescent powder units of various colors that constitute the fluorescent powder layer made in a size in the order of a pixel so as to reduce the color overlapping of the three primary colors of R, G, and B resulting from the half peak widths of the CF spectrums, effectively increase the color gamut of the liquid crystal display module, provide the liquid crystal display module with high color saturation, have a simple structure, and be easily achieved.

For better understanding of the features and technical contents of the present invention, reference will be made to the following detailed description of the present invention and the attached drawings. However, the drawings are provided for the purposes of reference and illustration and are not intended to impose limitations to the present invention.

BRIEF DESCRIPTION OF THE DRAWINGS

The technical solution, as well as other beneficial advantages, of the present invention will be apparent from the following detailed description of embodiments of the present invention, with reference to the attached drawing.

In the drawing.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
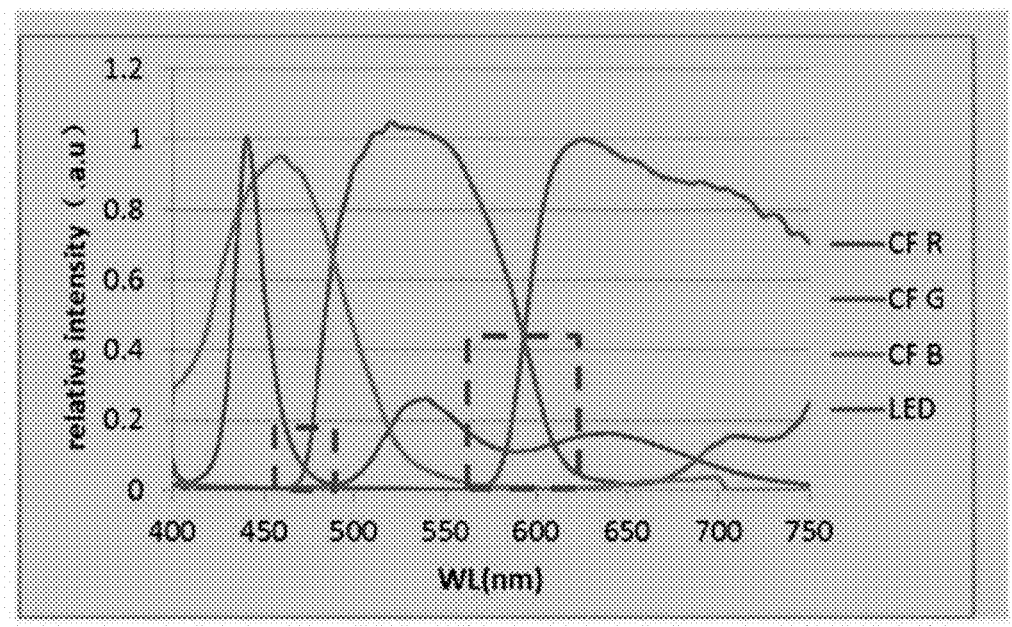
FIG. 1 shows CF spectrums of a conventional commonly used liquid crystal display module and light spectrum of a white LED.
Figure 2:
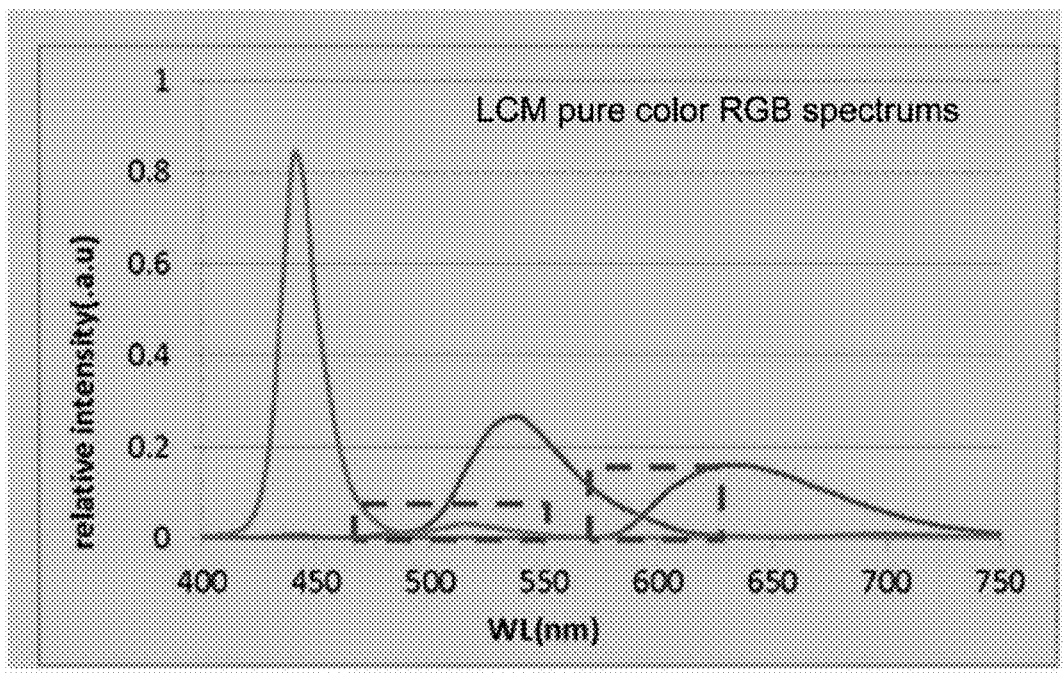
FIG. 2 shows light spectrums of the pure color points of the three primary colors of R, G, and B of a conventional commonly used liquid crystal display module.
Figure 3:
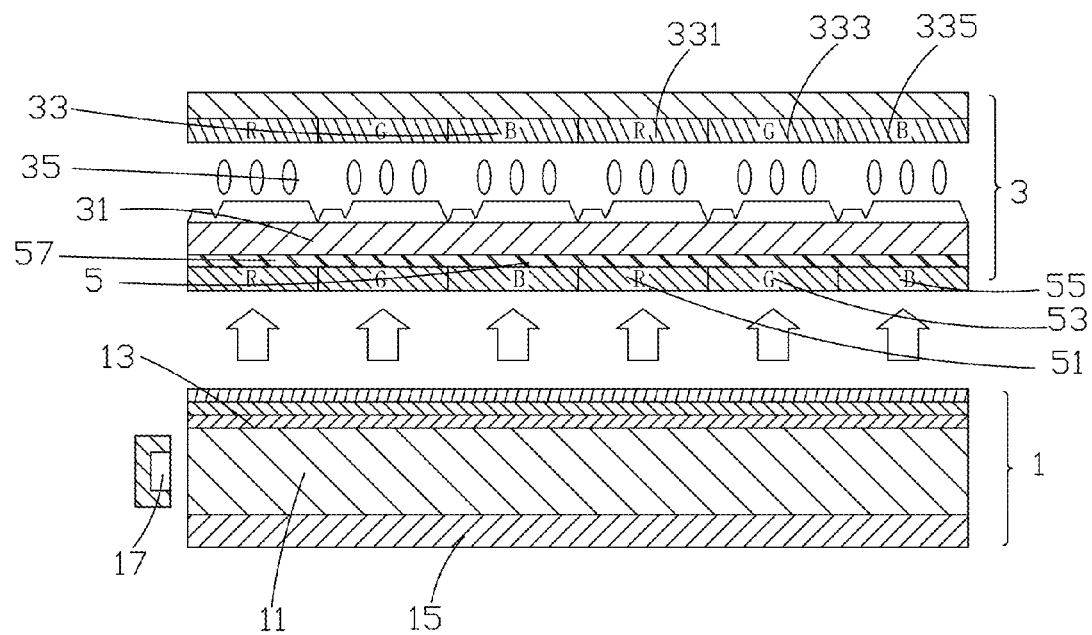
FIG. 3 is a schematic view showing the structure of a high color gamut liquid crystal display module according to a first embodiment of the present invention.

Referring to FIG. 3, which is a schematic view showing the structure of a high color gamut liquid crystal display module according to a first embodiment of the present invention, the structure of the high color gamut liquid crystal display module comprises a backlight module 1 and a liquid crystal display panel 3 arranged above the backlight module 1. The backlight module 1 comprises a light guide plate 11, an optical film assembly 13 arranged on an upper surface of the light guide plate 11, a bottom reflector plate 15 arranged on a lower surface of the light guide plate 11, and a light-emitting diode (LED) light source 17 arranged at one side of the light guide plate 11. The liquid crystal display panel 3 comprises a thin-film transistor (TFT) substrate 31, a color filter (CF) substrate 33 arranged above the TFT substrate 31, a liquid crystal layer 35 arranged between the TFT substrate 31 and the CF substrate 33, and a fluorescent powder layer 5 arranged on a lower surface of the TFT substrate 31.

The LED light source 17 is an LED light source having a wavelength below 460 nm, such as a blue LED light source, an ultraviolet LED light source, or LED light sources of other colors. In the first embodiment, the LED light source 17 is an ultraviolet LED light source or an LED light source of other colors.

The CF substrate 33 comprises red, green, and blue sub-pixel units that are arranged in a matrix. The red, green, and blue sub-pixel units respectively comprise red, green, and blue color resist units 331, 333, 335. The fluorescent powder layer 5 comprises red, green, and blue fluorescent powder units 51, 53, 55 that are arranged in a matrix. The red, green, and blue fluorescent powder units 51, 53, 55 are made in a size in the order of a pixel and are arranged to respectively correspond to the red, green, and blue color resist units 331, 333, 335. In the first embodiment, the fluorescent powder layer 5 further comprises a carrier 57, and the red, green, and blue fluorescent powder units 51, 53, 55 are arranged on the carrier 57. The carrier 57 is attached to the lower surface of the TFT substrate 31. Specifically, the carrier 57 is a transparent film or a glass plate. Further, the transparent film is made of a material of polyethylene terephthalate (PET), polypropylene (PP), or polymethyl methacrylate (PMMA).

The red, green, and blue fluorescent powder units 51, 53, 55 can be made of nitride fluorescent powders, sulfide fluorescent powders, or quantum dot fluorescent powders. In the first embodiment, the red, green, and blue fluorescent powder units 51, 53, 55 are made of nitride fluorescent powders.

Figure 4:
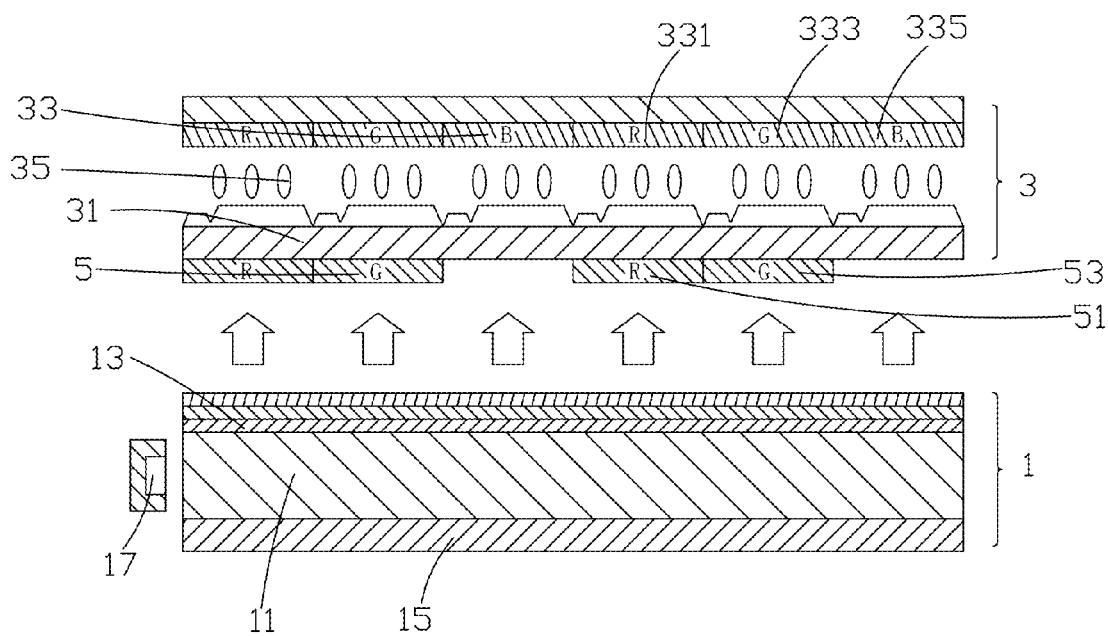
FIG. 4 is a schematic view showing the structure of a high color gamut liquid crystal display module according to a second embodiment of the present invention.

Referring to FIG. 4, which is a schematic view showing the structure of a high color gamut liquid crystal display module according to a second embodiment of the present invention, in the second embodiment, the LED light source 17 is a blue LED light source; the CF substrate 33 comprises red, green, and blue sub-pixel units that are arranged in a matrix, the red, green, and blue sub-pixel units respectively comprising red, green, and blue color resist units 331, 333, 335; and the fluorescent powder layer 5 comprises only red and green fluorescent powder units 51, 53 that are arranged in a matrix, the red and green 51, 53 being made in a size in the order of a pixel and arranged to respectively correspond to the red and green color resist units 331, 333.

In the second embodiment, the fluorescent powder layer 5 is directly attached to the lower surface of the TFT substrate without having the fluorescent powder layer 5 formed on a carrier.

The remaining is the same as that of the first embodiment and repeated description will be omitted here.

Figure 5:
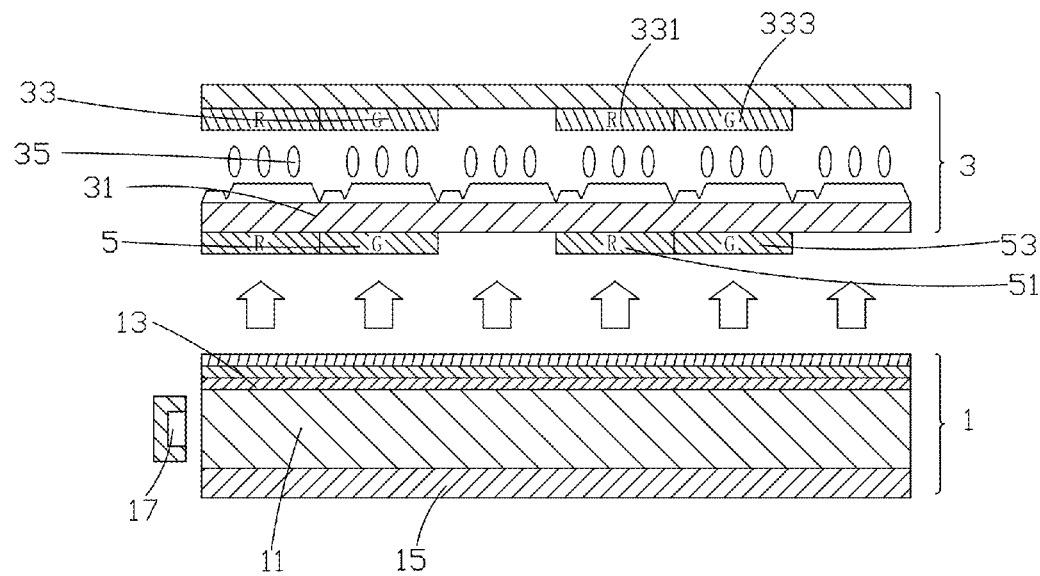
FIG. 5 is a schematic view showing the structure of a high color gamut liquid crystal display module according to a third embodiment of the present invention.

Referring to FIG. 5, a schematic view is given to show the structure of a high color gamut liquid crystal display module according to a third embodiment of the present invention. The third embodiment is basically similar to the second embodiment and uses a blue LED light source as the LED light source 17, of which the light emitting therefrom is blue light itself, so that the blue CF color resist unit 335 can be omitted and a blank unit can be used to replace the blue CF color resist unit 335 to allow for direct projection of the blue light.

The remaining is the same as that of the second embodiment and repeated description will be omitted here.

Figure 6:
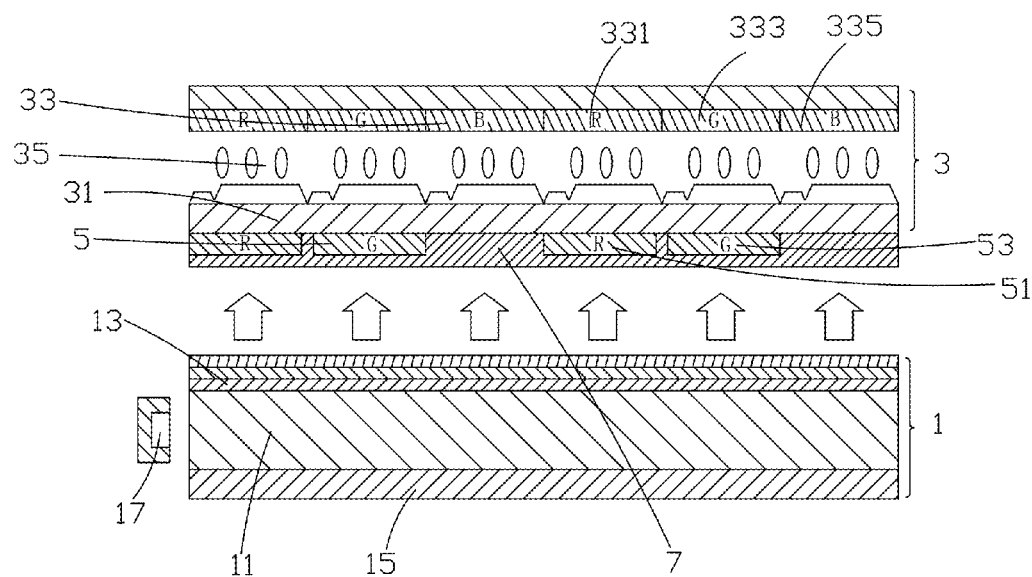
FIG. 6 is a schematic view showing the structure of a high color gamut liquid crystal display module according to a fourth embodiment of the present invention.

Referring to FIG. 6, a schematic view is given to show the structure of a high color gamut liquid crystal display module according to a fourth embodiment of the present invention. The fourth embodiment is different from the second embodiment in that the red and green fluorescent powder units 51, 53 are formed of sulfide fluorescent powders or quantum dot fluorescent powders. To prevent the red and green fluorescent powder units 51, 53 from rapid deterioration due to contact with moisture or oxygen, a protective layer 7 is additionally provided. The protective layer 7 covers and protects the red and green fluorescent powder units 51, 53 from contact with moisture and oxygen.

The remaining is the same as that of the second embodiment and repeated description will be omitted here.

Figure 7:
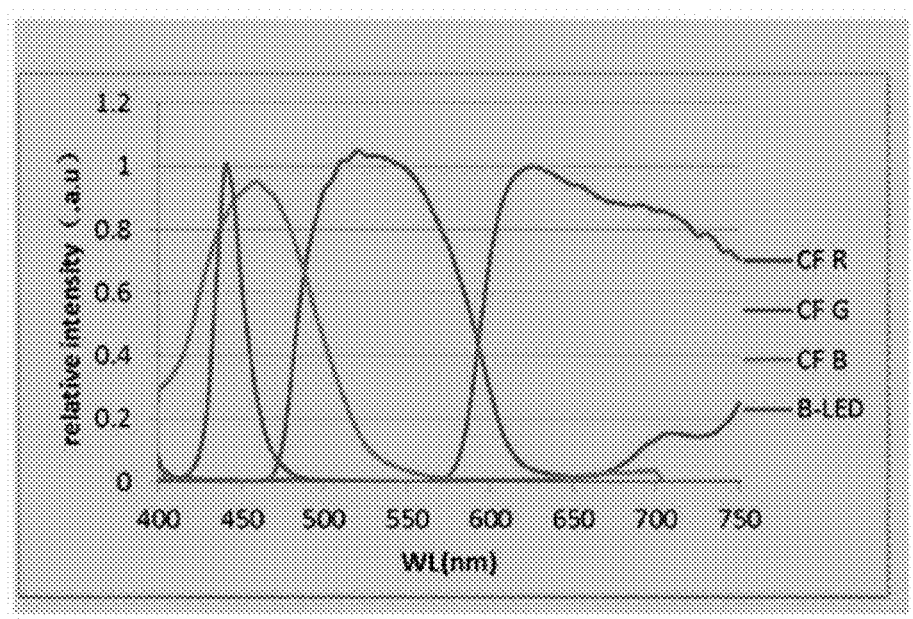
FIG. 7 shows CF spectrums of the structure of the high color gamut liquid crystal display module according to the present invention and light spectrum of a blue LED
Figure 8:
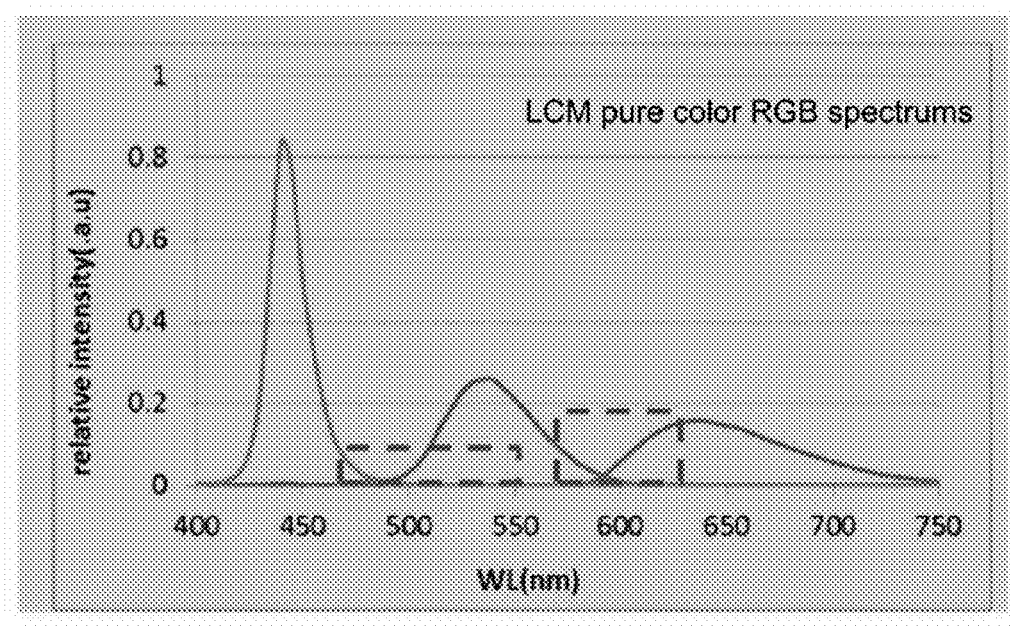
FIG. 8 shows light spectrums of the pure color points of the three primary colors of R, G, and B of the structure of the high color gamut liquid crystal display module according to the present invention.
Figure 9:
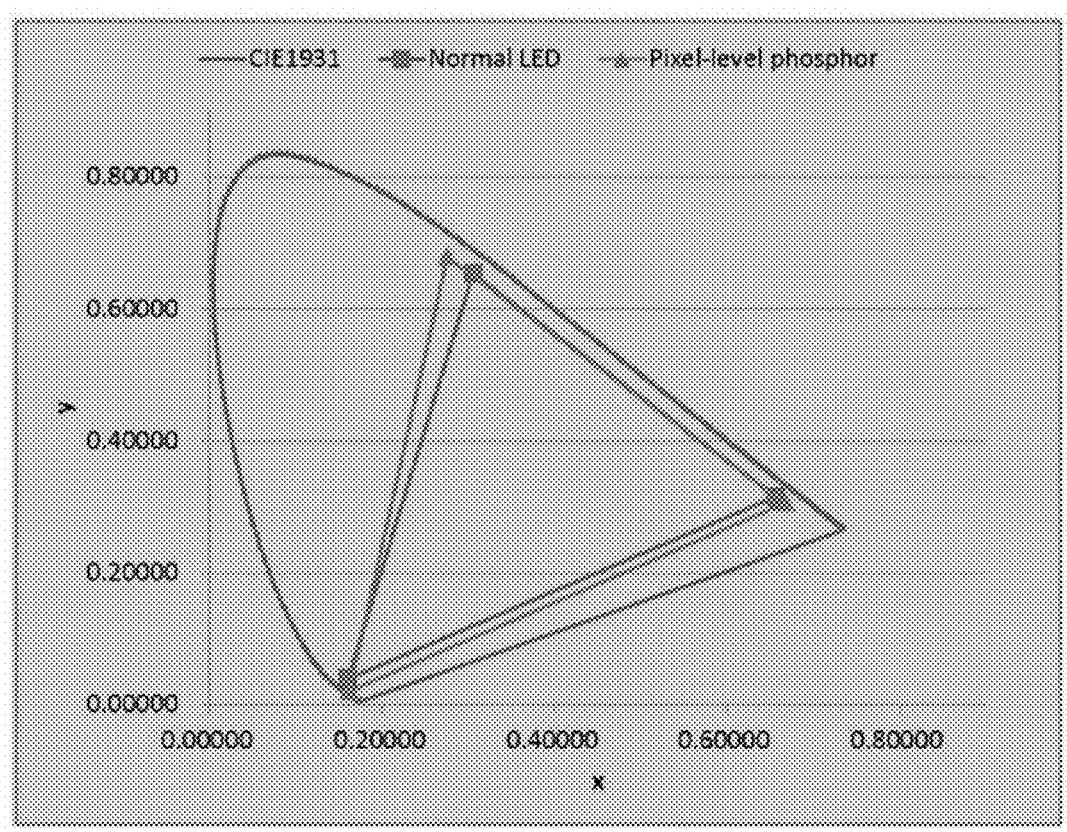
FIG. 9 is a CIE diagram showing comparison between the structure of the high color gamut liquid crystal display module according to the present invention and a conventional commonly used liquid crystal display module.

Referring to FIGS. 7, 8, and 9, the structure of the high color gamut liquid crystal display module according to the present invention, when compared to a conventional commonly used liquid crystal display module, can reduce color overlapping of the three primary colors of R, G, and B resulting from half peak widths of the CF spectrums so as to significantly decrease the overlapping area of the three primary colors of R, G, and B, allowing the pure color points of the three primary colors of R, G, and B to outward expand so that under the condition of using fluorescent powders of the same specifications, the color saturation is increased from 83.6% to 95%, providing the liquid crystal display module with a relatively high color gamut.

In summary, the present invention provides a structure of a high color gamut liquid crystal display module, which comprises an LED light source having a wavelength below 460 nm and a fluorescent powder layer arranged on a lower surface of a TFT substrate with the fluorescent powder units of various colors that constitute the fluorescent powder layer made in a size in the order of a pixel so as to reduce the color overlapping of the three primary colors of R, G, and B resulting from the half peak widths of the CF spectrums, effectively increase the color gamut of the liquid crystal display module, provide the liquid crystal display module with high color saturation, have a simple structure, and be easily achieved.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A structure of a high color gamut liquid crystal display module, comprising a backlight module and a liquid crystal display panel arranged above the backlight module, the backlight module comprising a light-emitting diode (LED) light source, the LED light source being an LED light source having a wavelength below 460nm, the liquid crystal display panel comprising a thin-film transistor (TFT) substrate, a color filter (CF) substrate arranged above the TFT substrate, a liquid crystal layer arranged between the TFT substrate and the CF substrate, and a fluorescent powder layer arranged on a lower surface of the TFT substrate, the CF substrate comprising red, green, and blue sub-pixel units arranged in a matrix;

wherein the red, green, and blue sub-pixel units respectively comprise red, green, and blue color resist units, and the fluorescent powder layer comprises red, green, and blue fluorescent powder units that are mounted on the TFT substrate to respectively correspond to the red, green, and blue color resist units mounted on the CF substrate; and wherein the red, green, and blue fluorescent powder units are mounted on the TFT substrate such that one side thereof that is distant from the TFT substrate faces the LED light source and a protective layer is arranged to cover the side of the red, green, and blue fluorescent powder units that is distant from the TFT substrate and faces the LED light source in order to prevent the red, green, and blue fluorescent powder units from contact with moisture and oxygen.

2. The structure of the high color gamut liquid crystal display module as claimed in claim 1, wherein the fluorescent powder layer further comprises a carrier, the red, green, or blue fluorescent powder units being arranged on the carrier, the carrier being attached to a lower surface of the TFT substrate.

3. The structure of the high color gamut liquid crystal display module as claimed in claim 2, wherein the carrier comprises a transparent film or a glass plate, the transparent film being made of a material of polyethylene terephthalate, polypropylene, or polymethyl methacrylate.

4. The structure of the high color gamut liquid crystal display module as claimed in claim 1, wherein the fluorescent powder layer is directly attached to the lower surface of the TFT substrate.

5. The structure of the high color gamut liquid crystal display module as claimed in claim 1, wherein the red, green, or blue fluorescent powder units are formed of nitride fluorescent powders, sulfide fluorescent powders, or quantum dot fluorescent powders.

6. The structure of the high color gamut liquid crystal display module as claimed in claim 5, wherein the protective layer is made of a material of silicon rubber.

7. The structure of the high color gamut liquid crystal display module as claimed in claim 1, wherein the backlight module further comprises a light guide plate, an optical film assembly arranged on an upper surface of the light guide plate, and a bottom reflector plate arranged on a lower surface of the light guide plate, the LED light source being arranged at one side of the light guide plate.

8. A structure of a high color gamut liquid crystal display module, comprising a backlight module and a liquid crystal display panel arranged above the backlight module, the backlight module comprising a light-emitting diode (LED) light source, the LED light source being an LED light source having a wavelength below 460nm, the liquid crystal display panel comprising a thin-film transistor (TFT) substrate, a color filter (CF) substrate arranged above the TFT substrate, a liquid crystal layer arranged between the TFT substrate and the CF substrate, and a fluorescent powder layer arranged on a lower surface of the TFT substrate, the CF substrate comprising red, green, and blue sub-pixel units arranged in a matrix;

the red, green, and blue sub-pixel units respectively comprising red, green, and blue color resist units, the fluorescent powder layer comprising the red, green, and blue fluorescent powder units, the red, green, and blue fluorescent powder units being mounted on the TFT substrate to respectively correspond to the red, green, and blue color resist units mounted on the CF substrate;

wherein the red, green, and blue fluorescent powder units are mounted on the TFT substrate such that one side thereof that is distant from the TFT substrate faces the LED light source and a protective layer is arranged to cover the side of the red, green, and blue fluorescent powder units that is distant from the TFT substrate and faces the LED light source in order to prevent the red, green, and blue fluorescent powder units from contact with moisture and oxygen;

the fluorescent powder layer further comprising a carrier, the red, green, or blue fluorescent powder units being arranged on the carrier, the carrier being attached to a lower surface of the TFT substrate;

wherein the carrier comprises a transparent film or a glass plate, the transparent film being made of a material of polyethylene terephthalate, polypropylene, or polymethyl methacrylate;

wherein the red, green, or blue fluorescent powder units are formed of nitride fluorescent powders; and wherein the backlight module further comprises a light guide plate, an optical film assembly arranged on an upper surface of the light guide plate, and a bottom reflector plate arranged on a lower surface of the light guide plate, the LED light source being arranged at one side of the light guide plate.

* * * * *